United States Patent
Sun et al.

(10) Patent No.: US 10,019,210 B2
(45) Date of Patent: Jul. 10, 2018

(54) PRINT SYSTEM THAT REDUCES TRANSMISSION FAILURE OF INSTRUCTION EXECUTION TYPE PRINT JOB AND RECORDING MEDIUM

(71) Applicant: Kyocera Document Solutions Inc., Osaka (JP)

(72) Inventors: Zhenyu Sun, Osaka (JP); Masafumi Sato, Osaka (JP); Yoshio Inoue, Osaka (JP); Tatsuya Hiwatari, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/469,522

(22) Filed: Mar. 25, 2017

(65) Prior Publication Data

US 2017/0277494 A1 Sep. 28, 2017

(30) Foreign Application Priority Data

Mar. 25, 2016 (JP) ................................. 2016-061301

(51) Int. Cl.
*G06F 3/12* (2006.01)
*H04N 1/00* (2006.01)

(52) U.S. Cl.
CPC .......... *G06F 3/1268* (2013.01); *G06F 3/1203* (2013.01); *G06F 3/1212* (2013.01); *G06F 3/1232* (2013.01); *G06F 3/1238* (2013.01); *G06F 3/1288* (2013.01); *H04N 1/00244* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| 2002/0080389 A1* | 6/2002 | Carney | G06F 3/1204 358/1.15 |
|---|---|---|---|
| 2012/0293819 A1* | 11/2012 | Doui | H04L 63/083 358/1.13 |

FOREIGN PATENT DOCUMENTS

JP 2015-058555 A 3/2015

* cited by examiner

*Primary Examiner* — Andrew H Lam
(74) *Attorney, Agent, or Firm* — James Judge (57) ABSTRACT

A printing system includes an electronic device and a print apparatus. The electronic device includes a central processing unit and a storage device, and generates a print job. The print apparatus executes the print job. The storage device stores a job transmission program. The CPU executes the job transmission program to function as a spool availability determination unit and a job transmitter. The spool availability determination unit executes a determination of whether the print apparatus is capable of spooling an instruction execution type print job as the print job, executed in accordance with a specific instruction. The job transmitter transmits the instruction execution type print job to the print apparatus when the spool availability determination unit determines that the print apparatus is capable of spooling the instruction execution type print job. The spool availability determination unit obtains determination information for the determination from the print apparatus.

4 Claims, 12 Drawing Sheets

PRINT SYSTEM THAT REDUCES TRANSMISSION FAILURE OF INSTRUCTION EXECUTION TYPE PRINT JOB AND RECORDING MEDIUM

INCORPORATION BY REFERENCE

This application is based upon, and claims the benefit of priority from, corresponding Japanese Patent Application No. 2016-061301 filed in the Japan Patent Office on Mar. 25, 2016, the entire contents of which are incorporated herein by reference.

BACKGROUND

Unless otherwise indicated herein, the description in this section is not prior art to the claims in this application and is not admitted to be prior art by inclusion in this section.

There is a typical printing system that transmits an instruction execution type print job from an electronic device to a print apparatus.

SUMMARY

A printing system according to one aspect of the disclosure includes an electronic device and a print apparatus. The electronic device generates a print job. The print apparatus executes the print job. The electronic device includes a central processing unit (CPU) and a storage device. The storage device stores a printer driver for generating print data and a job transmission program for transmitting the print data generated by the printer driver as the print job. The CPU executes the job transmission program to function as a spool availability determination unit and a job transmitter. The spool availability determination unit executes a determination of whether the print apparatus is capable of spooling an instruction execution type print job as the print job, executed in accordance with a specific instruction. The job transmitter transmits the instruction execution type print job to the print apparatus when the spool availability determination unit determines that the print apparatus is capable of spooling the instruction execution type print job. The spool availability determination unit obtains determination information for the determination from the print apparatus.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure by referring to the drawings.

First, a configuration of a printing system according to the embodiment will be described.

Figure 1:
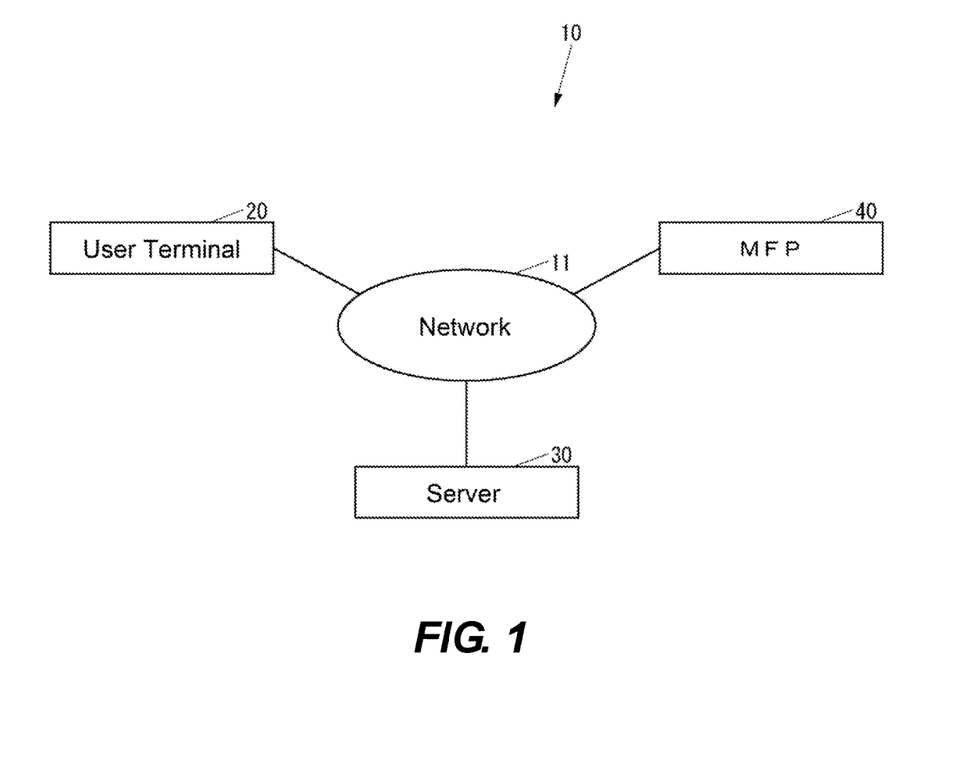
FIG. 1 illustrates a block diagram of a printing system according to one embodiment of the disclosure.

FIG. 1 illustrates a block diagram of a printing system 10 according to the embodiment.

As illustrated in FIG. 1, the printing system 10 includes a user terminal 20 as an electronic device that generates print data, a server 30, and a multifunction peripheral (MFP) 40 as a print apparatus that executes a print job. The user terminal 20, the server 30, and the MFP 40 are communicable with one another via a network 11, such as a local area network (LAN) and the Internet.

Other than the user terminal 20, the printing system 10 can include at least one user terminal similar to the user terminal 20. Similarly, other than the MFP 40, the printing system 10 can include at least one MFP similar to the MFP 40.

Figure 2:
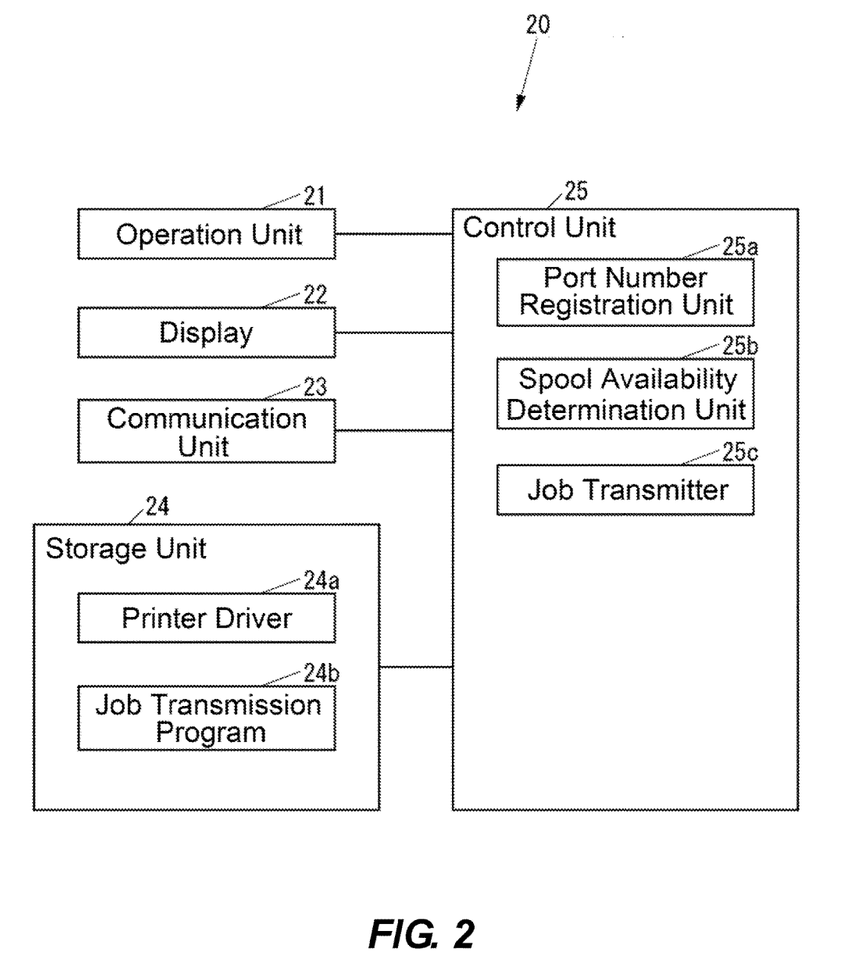
FIG. 2 illustrates a block diagram of a user terminal according to the one embodiment.

FIG. 2 illustrates a block diagram of the user terminal 20.

As illustrated in FIG. 2, the user terminal 20 includes an operation unit 21, a display 22, a communication unit 23, a storage unit 24, and a control unit 25. The operation unit 21 is an input device to which various kinds of operations by a user are input. The display 22 is a display device, such as a liquid crystal display (LCD), that displays various kinds of information. The communication unit 23 is a communication device that communicates with external devices via the network 11 (see FIG. 1). The storage unit 24 is a non-volatile storage device, such as a semiconductor memory and a hard disk drive (HDD), that stores various kinds of data. The control unit 25 controls the whole user terminal 20. The user terminal 20 is constituted of a portable terminal, such as a smart phone, or a computer, such as a personal computer (PC).

The storage unit 24 stores a printer driver 24a for generating print data and a job transmission program 24b for transmitting the print data generated by the printer driver 24a as a print job. Each of the printer driver 24a and the job transmission program 24b may be installed in the user terminal 20 at production stage of the user terminal 20, may be additionally installed in the user terminal 20 from an external storage medium, such as a universal serial bus (USB) flash drive, or may be additionally installed in the user terminal 20 from the network The control unit 25 includes, for example, a central processing unit (CPU), a read only memory (ROM), and a random access memory (RAM). The ROM stores programs and various kinds of data. The RAM is used as a work area of the CPU. The CPU executes the programs stored in the ROM or the storage unit 24.

The control unit 25 executes the job transmission program 24b to function as a port number registration unit 25a, a spool availability determination unit 25b, and a job transmitter 25c. The port number registration unit 25a registers a spool port number out of port numbers of the server 30 (see FIG. 1) and the MFP 40 (see FIG. 1) for spooling an instruction execution type print job as a print job that is executed in accordance with a specific instruction. The spool availability determination unit 25b executes a determination of whether the server 30 or the MFP 40 is capable of spooling the instruction execution type print job or not. The job transmitter 25c transmits the instruction execution type print job to the server 30 or the MFP 40.

Figure 3:
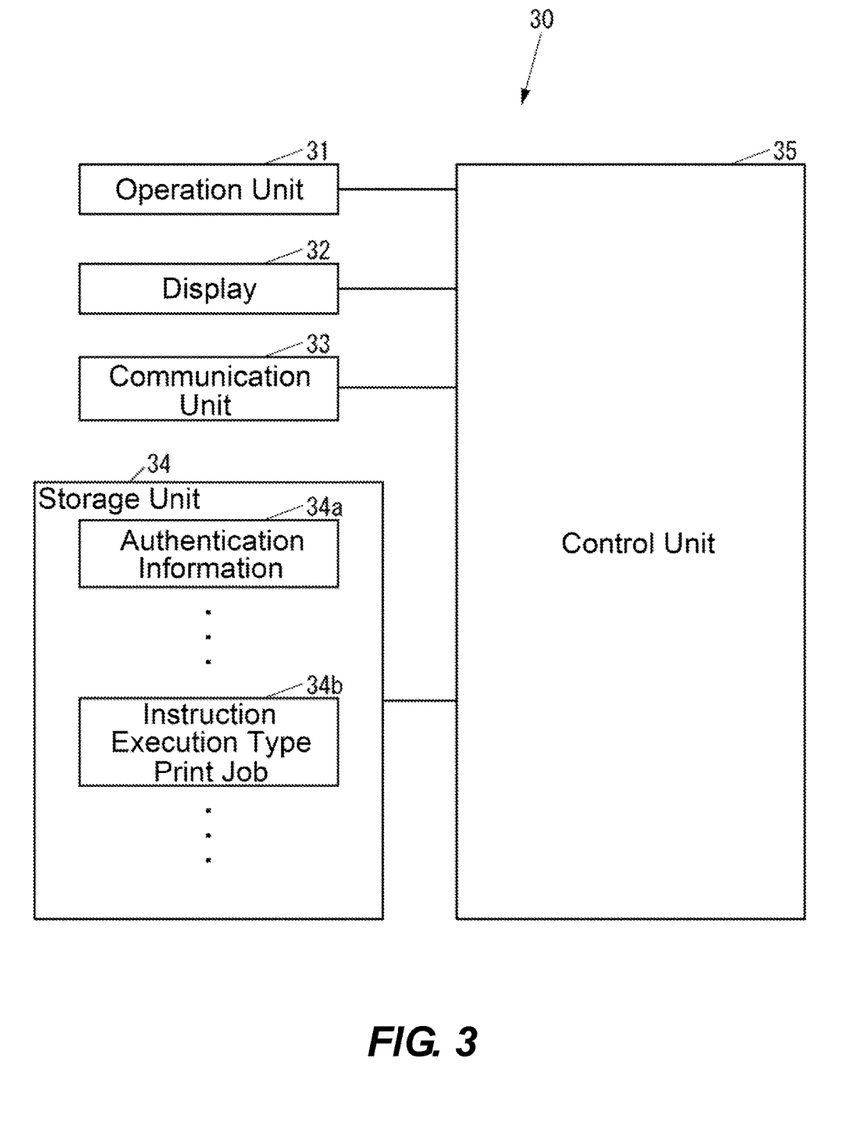
FIG. 3 illustrates a block diagram of a server according to the one embodiment.

FIG. 3 illustrates a block diagram of the server 30.

As illustrated in FIG. 3, the server 30 includes an operation unit 31, a display 32, a communication unit 33, a storage unit 34, and a control unit 35. The operation unit 31 is an input device, such as a computer mouse and a keyboard, to which various kinds of operations by the user are input. The display 32 is a display device, such as an LCD, that displays various kinds of information. The communication unit 33 is a communication device that communicates with external devices via the network 11 (see FIG. 1). The storage unit 34 is a non-volatile storage device, such as a semiconductor memory and an HDD, that stores various kinds of data. The control unit 35 controls the whole server 30. The server 30 is constituted of a computer, such as a PC.

The storage unit 34 stores authentication information 34a to authenticate the user, such as a combination of the user's identification information (hereinafter referred to as "user identification information") and the user's password.

The storage unit 34 can store a plurality of instruction execution type print jobs 34b. The storage unit 34 associates each of the instruction execution type print jobs 34b with any of the user identification information to store the instruction execution type print jobs 34b.

The control unit 35 includes, for example, the CPU, the ROM, and the RAM. The ROM stores programs and various kinds of data. The RAM is used as a work area of the CPU. The CPU executes the programs stored in the ROM or the storage unit 34.

Figure 4:
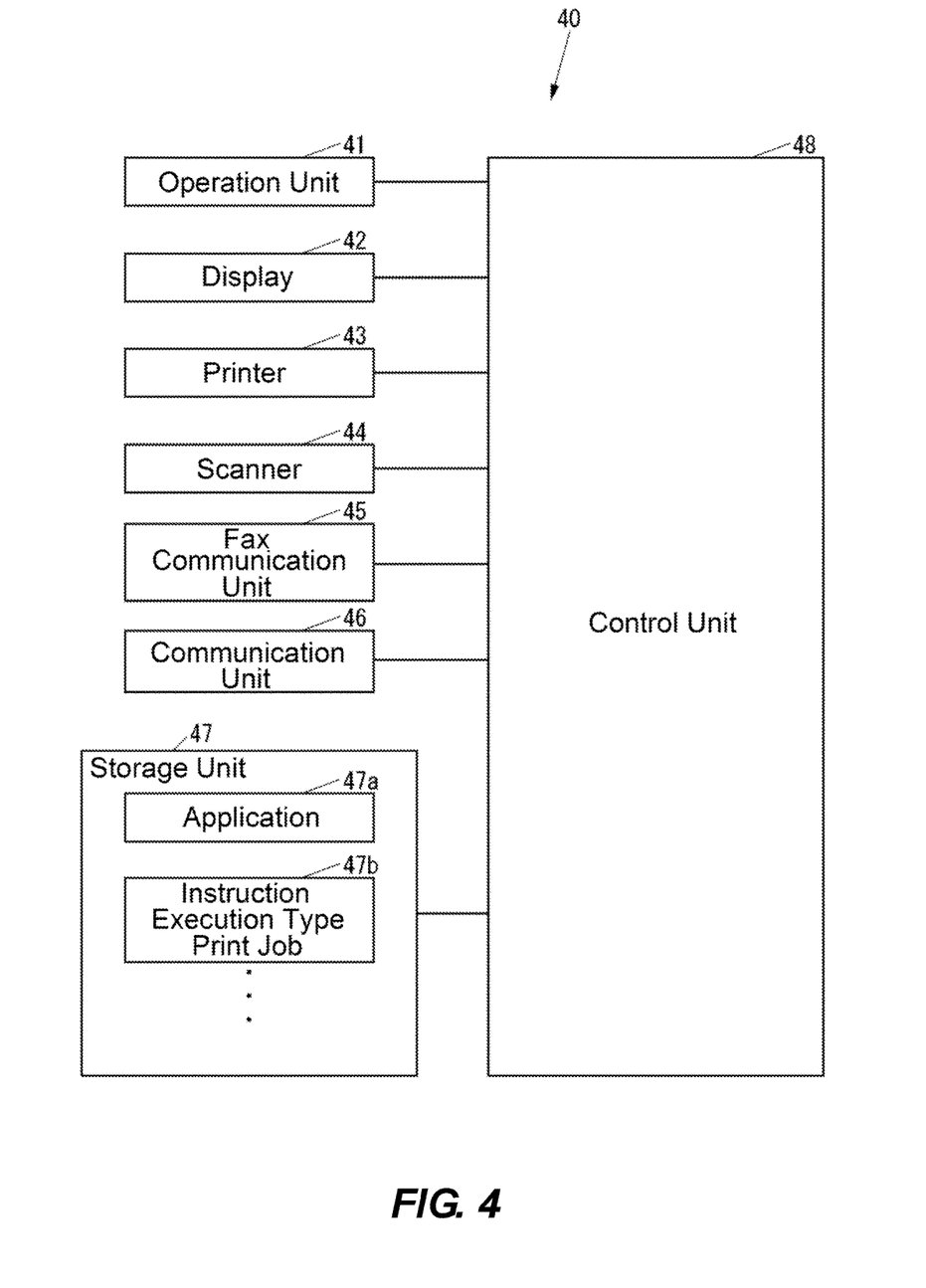
FIG. 4 illustrates a block diagram of an MFP according to the one embodiment.

FIG. 4 illustrates a block diagram of the MFP 40.

As illustrated in FIG. 4, the MFP 40 includes an operation unit 41, a display 42, a printer 43, a scanner 44, a fax communication unit 45, a communication unit 46, a storage unit 47, and a control unit 48. The operation unit 41 is an input device, such as a button, to which various kinds of operations by the user are input. The display 42 is a display device, such as an LCD, that displays various kinds of information. The printer 43 is a print device that executes printing on a recording medium, such as a paper sheet. The scanner 44 is a reading device that reads image data from an original document. The fax communication unit 45 is a fax device that performs a fax communication with an external facsimile device (not illustrated) via a communication line, such as a dial-up line. The communication unit 46 is a network communication device that communicates with external devices via the network 11 (see FIG. 1). The storage unit 47 is a non-volatile storage device, such as a semiconductor memory and an HDD, that stores various kinds of data. The control unit 48 controls the whole MFP 40.

The storage unit 47 stores an application 47a as a Java (registered trademark) application. The application 47a may be installed in the MFP 40 at production stage of the MFP 40, may be additionally installed in the MFP 40 from an external storage medium, such as an SD card and an USB flash drive, or may be additionally installed in the MFP 40 from the network 11. In the storage unit 47, although the illustration is omitted, a Java platform that is executed by the control unit 48 is also stored to execute the application 47a.

The storage unit 47 can store a plurality of instruction execution type print jobs 47b. The storage unit 47 associates each of the instruction execution type print jobs 47b with any of the user identification information to store the instruction execution type print jobs 47b.

The control unit 48 includes, for example, the CPU, the ROM, and the RAM. The ROM stores programs and various kinds of data. The RAM is used as a work area of the CPU. The CPU executes programs stored in the ROM or the storage unit 47.

The MFP 40 has a low processing capacity of data and a little capacity for storing the instruction execution type print jobs compared with the server 30.

Next, operations of the printing system 10 will be described.

First, the following describes operations of the printing system 10 when the user logs in to the printing system 10 from the user terminal 20.

Figure 5:
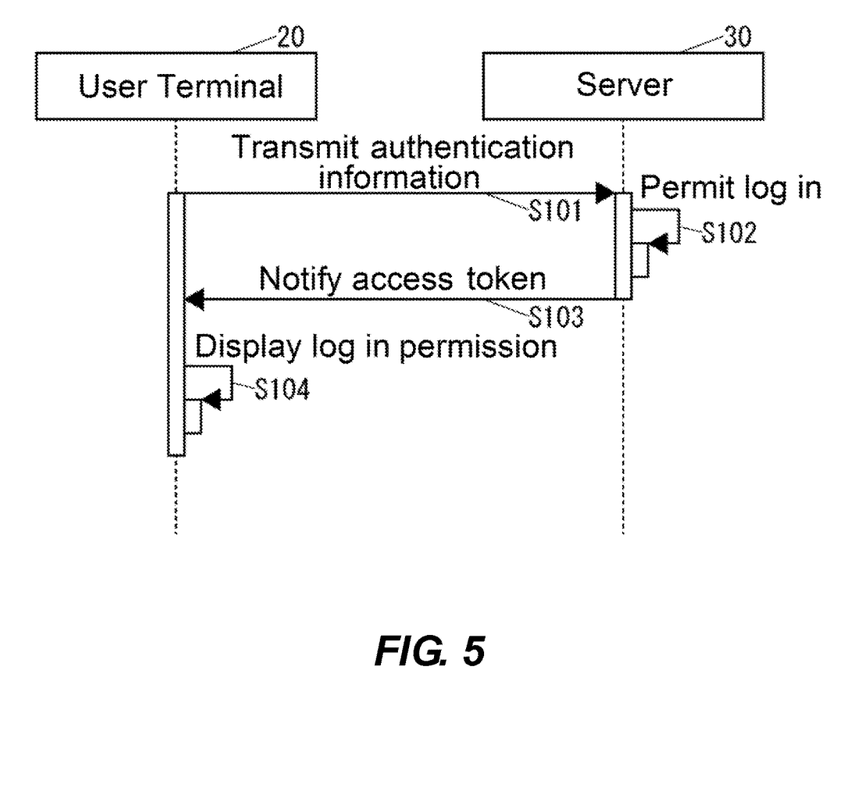
FIG. 5 illustrates a sequence diagram of operations of a printing system according to the one embodiment when a user logs in to the printing system from a user terminal.

FIG. 5 illustrates a sequence diagram of the operations of the printing system 10 when the user logs in to the printing system 10 from the user terminal 20.

The user is allowed to log in to the printing system 10 by inputting the authentication information via, for example, the operation unit 21 of the user terminal 20. Here, the authentication information is, for example, the combination of the user identification information and the password. The control unit 25 of the user terminal 20 executes the operation illustrated in FIG. 5 upon input of the authentication information.

As illustrated in FIG. 5, the control unit 25 transmits the input authentication information to the server 30 (Step S101).

Then, the control unit 35 of the server 30 permits the user to log in (Step S102) when the storage unit 34 stores the authentication information 34a identical to the authentication information transmitted from the user terminal 20, and then notifies the user terminal 20 of an access token indicative of the permission (Step S103).

Upon being notified of the user's access token from the server 30, the control unit 25 of the user terminal 20 notifies the user of the permission of the user's login via the display 22 (Step S104), and the operations illustrated in FIG. 5 is terminated.

Next, the following describes operations of the user terminal 20 when registering the spool port number of the server 30 and the MFP 40.

Figure 6:
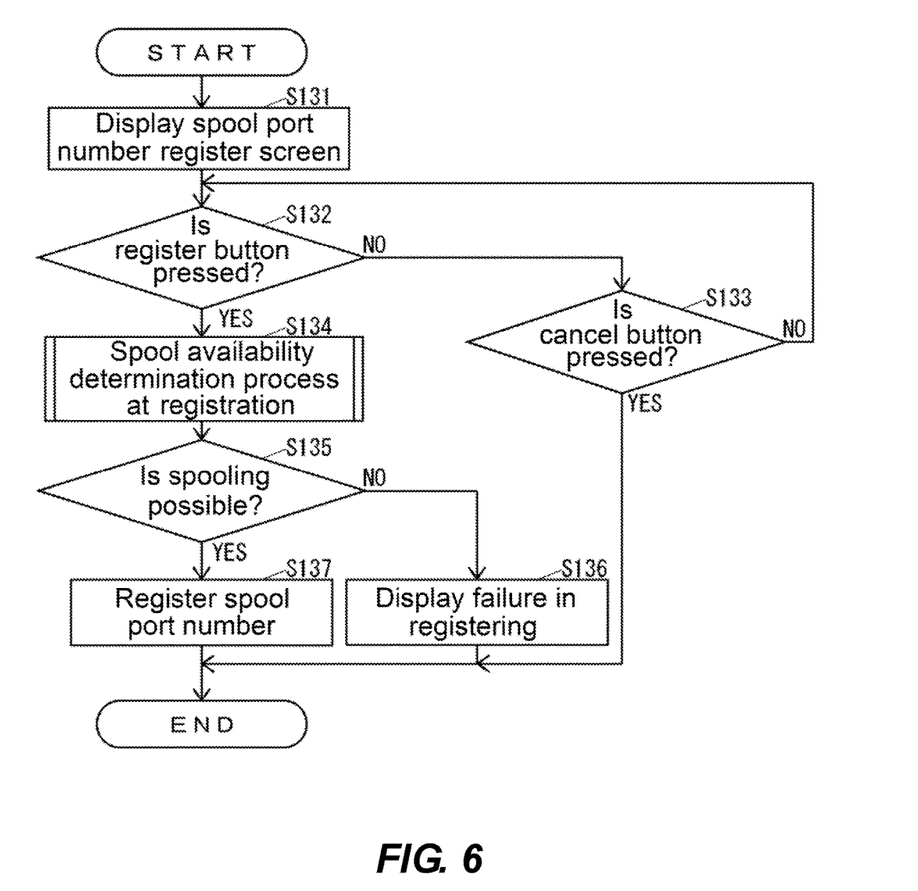
FIG. 6 illustrates a flowchart of operations of the user terminal according to the one embodiment when a spool port number of a server or an MFP is registered.

FIG. 6 illustrates a flowchart of the operations of the user terminal 20 when registering the spool port number of the server 30 and the MFP 40.

Upon being instructed to start the operations to register the spool port number via the operation unit 21, the control unit 25 of the user terminal 20 starts the operations illustrated in FIG. 6.

As illustrated in FIG. 6, the port number registration unit 25a of the control unit 25 displays a spool port number registration screen 50 (see FIG. 7) for registering the spool port number on the display 22 (Step S131).

Figure 7:
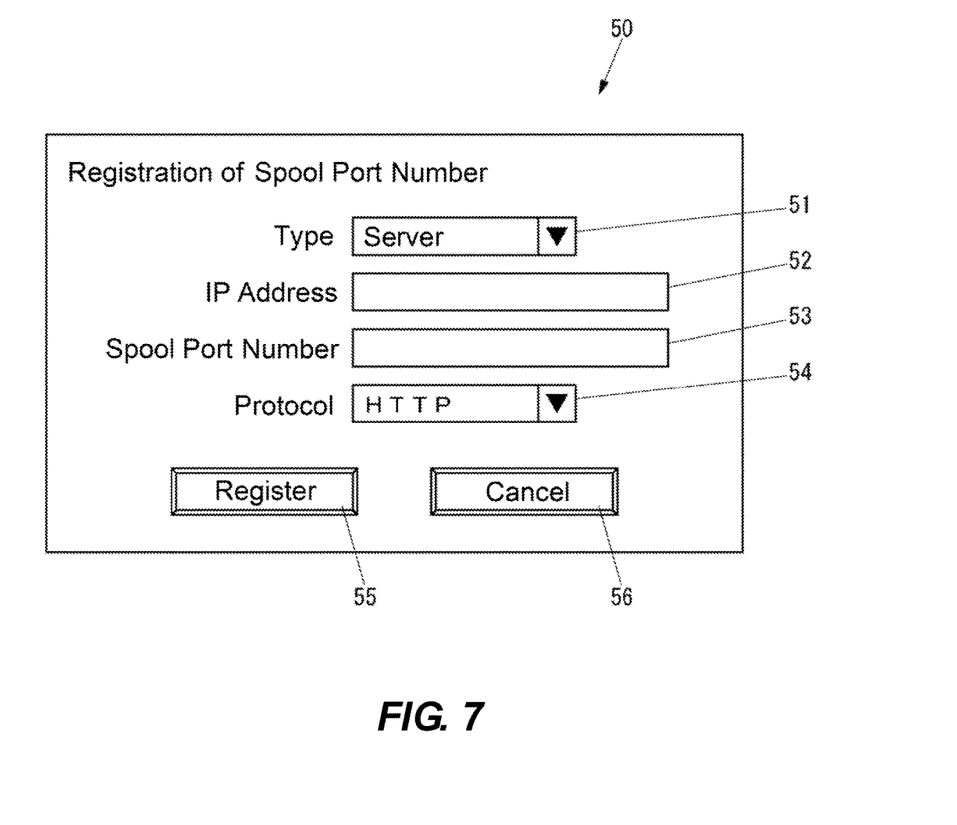
FIG. 7 illustrates an exemplary of a register screen of a spool port number displayed in operations according to the one embodiment.

The spool port number registration screen 50 illustrated in FIG. 7 includes a pull-down menu 51, a text box 52, a text box 53, a pull-down menu 54, a registration button 55, and a cancel button 56. The pull-down menu 51 is to specify a type of a device subject to the registration of the spool port number, such as the server and the print apparatus. The text box 52 is to input an internet protocol (IP) address of the device subject to the registration of the spool port number. The text box 53 is to input the spool port number of this device. The pull-down menu 54 is to specify a communication protocol when communication is made via this spool port number. The registration button 55 is to register the combination of the type specified by the pull-down menu 51, the IP address input in the text box 52, the spool port number input in the text box 53, and the communication protocol specified by the pull-down menu 54. The cancel button 56 is to terminate the operations to register the spool port number.

As illustrated in FIG. 6, the port number registration unit 25a determines whether the registration button 55 is pressed or not after the process of Step S131 (Step S132).

Upon determining that the registration button 55 is not pressed at Step S132, the port number registration unit 25a determines whether the cancel button 56 is pressed or not (Step S133).

Upon determining that the cancel button 56 is pressed at Step S133, the port number registration unit 25a terminates the operations illustrated in FIG. 6.

Upon determining that the cancel button 56 is not pressed at Step S133, the port number registration unit 25a executes the process at Step S132.

Upon determining that the registration button 55 is pressed at Step S132, the spool availability determination unit 25b executes a spool availability determination process at registration to determine whether the device indicated by the IP address input in the text box 52 is capable of spooling the instruction execution type print job or not (Step S134).

Next, the port number registration unit 25a determines whether the determination result at Step S134 is a determination result that the instruction execution type print job can be spooled or not (Step S135).

Upon determining that the determination result is that the instruction execution type print job cannot be spooled at Step S135, the port number registration unit 25a displays the failure of registering the spool port number on the display 22 (Step S136) and terminates the operations in FIG. 6.

Upon determining that the determination result is that the instruction execution type print job can be spooled at Step S135, the port number registration unit 25a registers the combination of the type specified by the pull-down menu 51, the IP address input in the text box 52, the spool port number input in the text box 53, and the communication protocol specified by the pull-down menu 54 (Step S137), and terminates the operations illustrated in FIG. 6.

Regarding the server 30, the type specified by the pull-down menu 51, the spool port number input in the text box 53, and the communication protocol specified by the pull-down menu 54 are, for example, "the server," "717," and "HTTP," respectively.

Regarding the MFP 40, the type specified by the pull-down menu 51, the spool port number input in the text box 53, and the communication protocol specified by the pull-down menu 54 are, for example, "print apparatus," "11108," and "UDP," respectively. Here, "11108" is not a port number provided by firmware of the MFP 40, but is a port number provided by the application 47a that operates on the firmware of the MFP 40.

Figure 8:
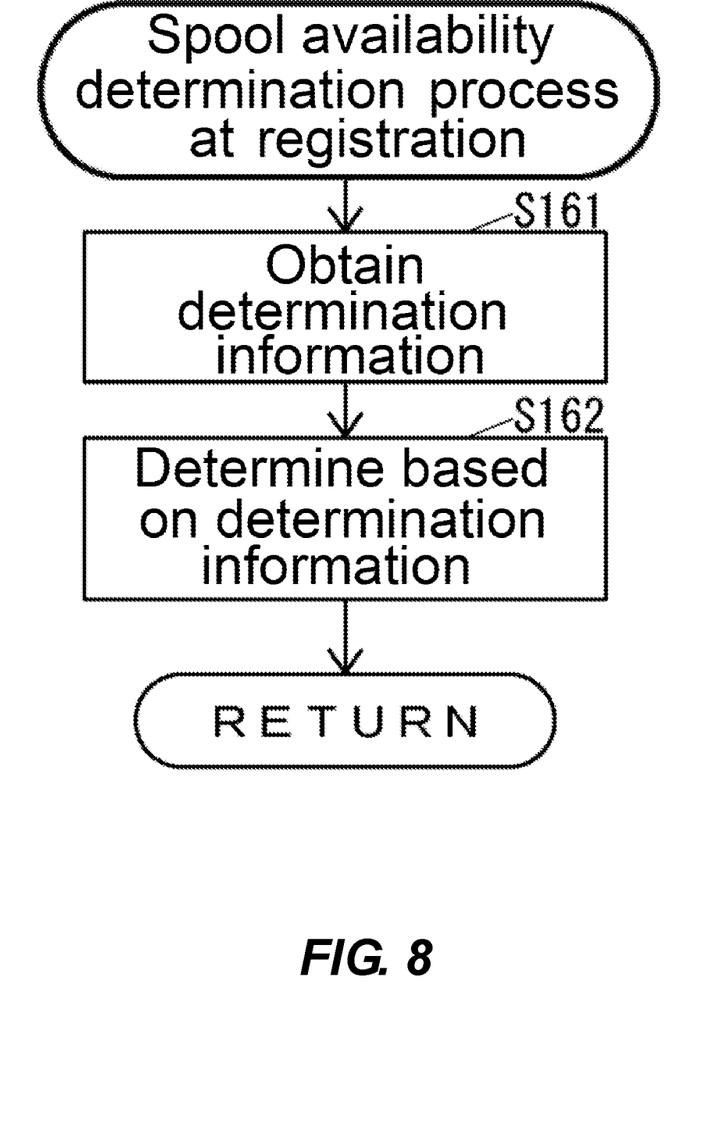
FIG. 8 illustrates a flowchart of a spool availability determination process at registration according to the one embodiment.

FIG. 8 illustrates the spool availability determination process at registration illustrated in FIG. 6.

While the following describes the case where whether the MFP 40 is capable of spooling the instruction execution type print job or not is determined, the same applies to the case where whether the server 30 is capable of spooling the instruction execution type print job or not is determined.

As illustrated in FIG. 8, the spool availability determination unit 25b calls a service, which is provided by the MFP 40 executing the application 47a, to obtain determination information for determining whether the MFP 40 is capable of spooling the instruction execution type print job or not from the MFP 40 (Step S161). Here, the spool availability determination unit 25b uses the combination of the IP address input in the text box 52, the spool port number input in the text box 53, and the communication protocol specified by the pull-down menu 54 for the communication with the MFP 40. The spool availability determination unit 25b can determine that the device subject to the determination is a print apparatus based on the type specified by the pull-down menu 51.

The determination information includes a version of the application 47a and information whether a spool function of the instruction execution type print job is effective or not in the application 47a. The spool availability determination unit 25b manages the version of the application 47a when the application 47a includes the spool function of the instruction execution type print job. Thus, the spool availability determination unit 25b can determine whether the application 47a includes the spool function of the instruction execution type print job or not based on the version of the application 47a.

After the process at Step S161, the spool availability determination unit 25b, determines whether the MFP 40 is capable of spooling the instruction execution type print job or not based on the determination information obtained at Step S161 (Step S162), and then terminates the operations illustrated in FIG. 8.

Next, the following describes operations of the user terminal 20 when causing the server 30 or the MFP 40 to spool the instruction execution type print job.

Figure 9:
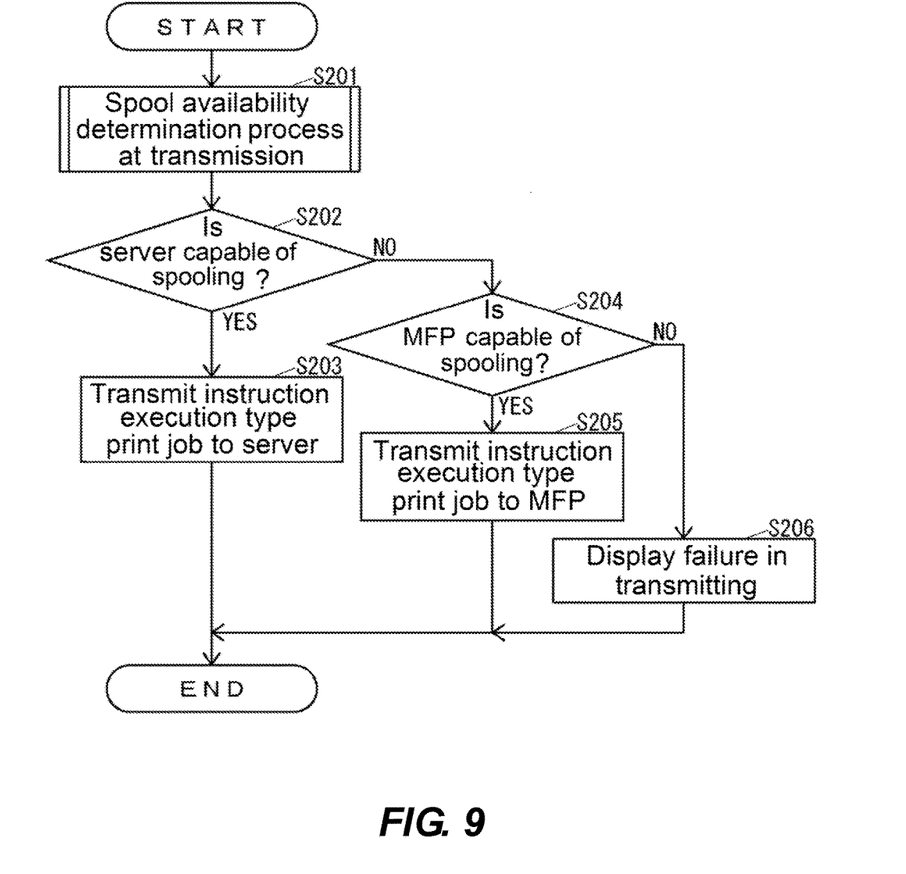
FIG. 9 illustrates a flowchart of operations of the user terminal according to the one embodiment when causing the server or the MFP to spool the instruction execution type print job.

FIG. 9 illustrates the operations of the user terminal 20 when causing the server 30 or the MFP 40 to spool the instruction execution type print job.

Upon being instructed to start the operations to spool the instruction execution type print job via the operation unit 21, the control unit 25 of the user terminal 20 starts the operations illustrated in FIG. 9.

As illustrated in FIG. 9, the spool availability determination unit 25b of the control unit 25 executes a spool availability determination process at transmission to determine whether each of the server 30 and the MFP 40 are capable of spooling spool the instruction execution type print job or not (Step S201).

Figure 10:
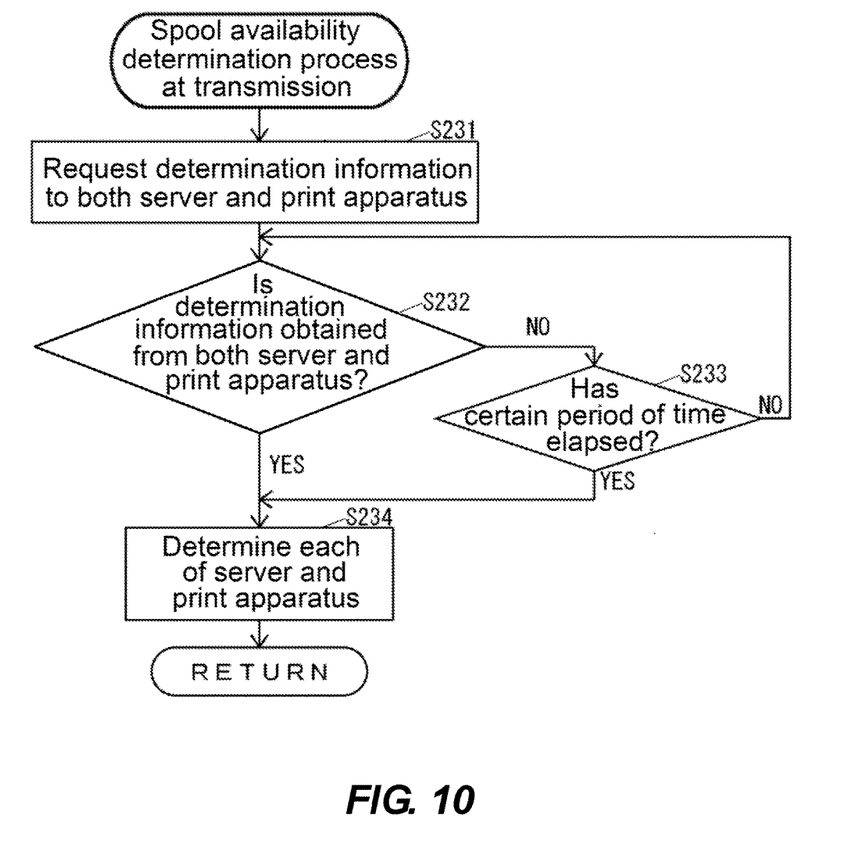
FIG. 10 illustrates a flowchart of a spool availability determination process at transmission according to the one embodiment.

FIG. 10 illustrates the spool availability determination process at transmission illustrated in FIG. 9.

As illustrated in FIG. 10, the spool availability determination unit 25b requests the determination information to both the server and the print apparatus whose spool port number is registered in the operations illustrated in FIG. 6 (Step S231). For example, the spool availability determination unit 25b, similarly to the process at Step S161, calls the service, which is provided by the MFP 40 executing the application 47a, with respect to the print apparatus, namely, the MFP 40 to obtain the determination information from the MFP 40. In the request at Step S231, the IP address, the spool port number, and the communication protocol registered at Step S137 are used.

Next, the spool availability determination unit 25b determines whether the determination information is obtained from both the server and the print apparatus or not (Step S232).

Upon determining that the determination information is not obtained from at least one of the server and the print apparatus at Step S232, the spool availability determination unit 25b determines whether a certain period of time, such as one second, has elapsed after the process at Step S231 or not (Step S233).

Upon determining that the certain period of time has not elapsed at Step S233, the spool availability determination unit 25b executes the process at Step S232.

Upon determining whether the determination information is obtained from both the server and the print apparatus at Step S232 or the certain period of time has elapsed at Step S233, the spool availability determination unit 25b determines whether the instruction execution type print job can be spooled or not for each of the server and the print apparatus (Step S234), and then terminates the operations illustrated in FIG. 10. Here, the spool availability determination unit 25b determines that the instruction execution type print job cannot be spooled when the determination information is not obtained. The spool availability determination unit 25b determines whether the instruction execution type print job can be spooled or not based on the determination information when the determination information is obtained.

As illustrated in FIG. 9, the job transmitter 25c of the control unit 25 determines whether the server 30 is capable of spooling the instruction execution type print job or not based on the determination result at Step S201 after the process at Step S201 (Step S202).

Upon determining that the server 30 is capable of spooling the instruction execution type print job at Step S202, the job transmitter 25c transmits the print data generated by the printer driver 24a as the instruction execution type print job with the user identification information and the access token to the server 30 (Step S203), and then terminates the operations illustrated in FIG. 9. Accordingly, the control unit 35 of the server 30 stores (spools) the instruction execution type print job transmitted from the user terminal 20 as the instruction execution type print job 34b in the storage unit 34 after confirming that it is not an invalid access based on the access token transmitted from the user terminal 20. The instruction execution type print job 34b is stored (spooled) being associated with the user identification information transmitted from the user terminal 20. In the transmission at Step S203, the IP address, the spool port number, and the communication protocol registered at Step S137 are used.

Upon determining that the server 30 is not capable of spooling the instruction execution type print job at Step S202, the job transmitter 25c determines whether the MFP 40 is capable of spooling the instruction execution type print job or not based on the determination result at Step S201 (Step S204).

Upon determining that the MFP 40 is capable of spooling the instruction execution type print job at Step S204, the job transmitter 25c transmits the print data generated by the printer driver 24a as the instruction execution type print job with the user identification information and the access token to the MFP 40 (Step S205), and then terminates the operations illustrated in FIG. 9. Accordingly, the control unit 48 executing the application 47a of the MFP 40 stores (spools) the instruction execution type print job transmitted from the user terminal 20 as the instruction execution type print job 47b in the storage unit 47 after confirming that it is not an invalid access based on the access token transmitted from the user terminal 20. The instruction execution type print job 47b is stored (spooled) being associated with the user identification information transmitted from the user terminal 20. In the transmission at Step S205, the IP address, the spool port number, and the communication protocol registered at Step S137 are used.

Upon determining that the MFP 40 is not capable of spooling the instruction execution type print job at Step S204, the job transmitter 25c displays the failure of transmitting the instruction execution type print job on the display 22 (Step S206), and then terminates the operations illustrated in FIG. 9.

As described above, the MFP 40 has a low processing capacity of data and a little capacity for storing the instruction execution type print job compared with the server 30. Accordingly, in the operations illustrated in FIG. 9, the server 30 is given priority over the MFP 40 as a transmission destination of the instruction execution type print job.

Next, the following describes operations of the printing system 10 when the user logs in to the printing system 10 from the MFP 40.

The user is allowed to log in to the printing system 10 by inputting the authentication information via, for example, the operation unit 41 of the MFP 40.

The operations of the printing system 10 when the user logs in to the printing system 10 from the MFP 40 is similar to the operations of the printing system 10 when the user logs in to the printing system 10 from the user terminal 20.

Next, the following describes operations of the MFP 40 when executing the instruction execution type print job that is spooled by the server 30 or the MFP 40.

Figure 11:
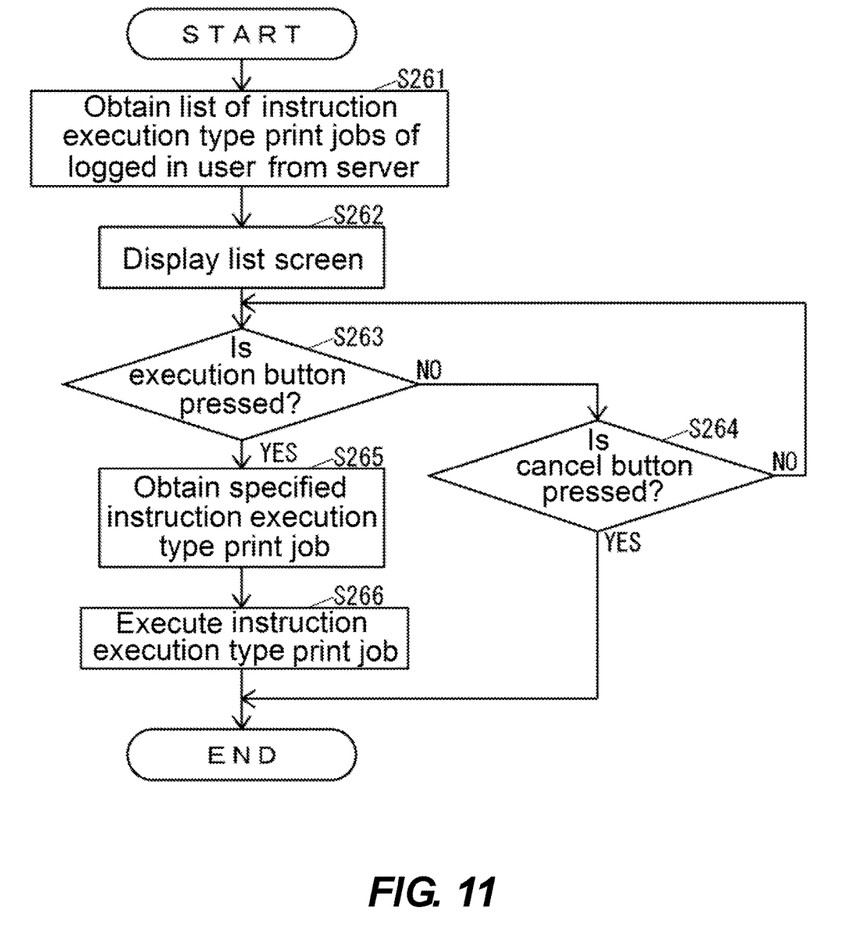
FIG. 11 illustrates a flowchart of operations of the MFP according to the one embodiment when executing the instruction execution type print job that is spooled by the server or the MFP.

FIG. 11 illustrates the operations of the MFP 40 when executing the instruction execution type print job that is spooled by the server 30 or the MFP 40.

The user is allowed to instruct to start the operations to execute the instruction execution type print job via, for example, the operation unit 41 of the MFP 40. Upon being instructed to start the operations to execute the instruction execution type print job, the control unit 48 of the MFP 40 executes the operations illustrated in FIG. 11 by executing the application 47a.

As illustrated in FIG. 11, the control unit 48 transmits the user identification information of the user who is logged in to the server 30 to obtain a list of the instruction execution type print jobs 34b of the logged in user from the server 30 out of the instruction execution type print jobs 34b that the server 30 spools (Step S261).

Next, the control unit 48 displays a list screen 60 (see FIG. 12) on the display 42 (Step S262). The list screen 60 is a mix of the list of the instruction execution type print jobs 47b of the logged in user out of the instruction execution type print jobs 47b spooled by the storage unit 47 and the list obtained at Step S261.

Figure 12:
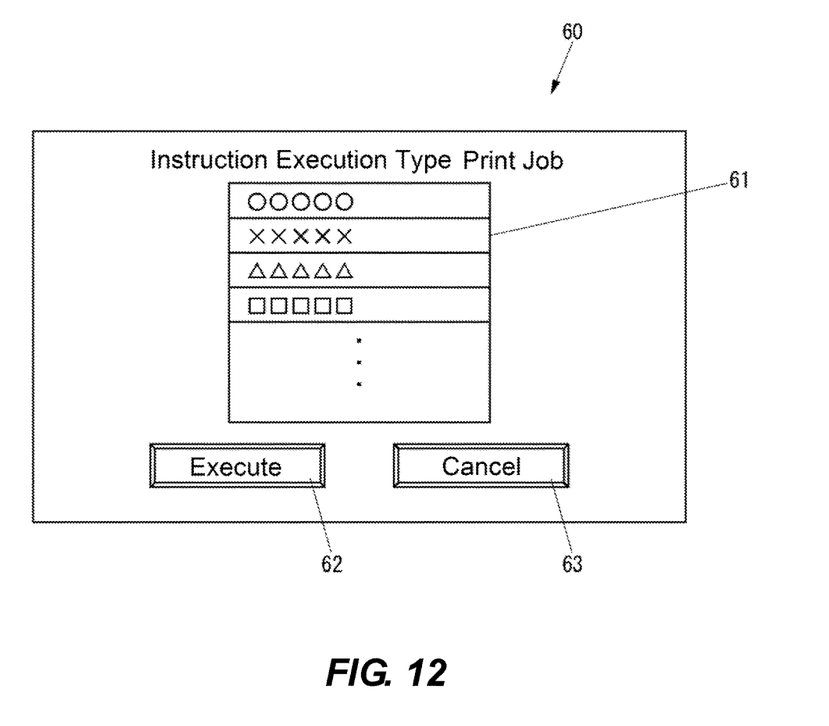
FIG. 12 illustrates an exemplary of a list screen displayed in operations according to the one embodiment.

The list screen 60 illustrated in FIG. 12 includes a list box 61, an execution button 62 and a cancel button 63. The list box 61 shows a list of the instruction execution type print jobs of the user who is permitted to log in. The execution button 62 is for executing the instruction execution type print job specified in the list box 61. The cancel button 63 is for terminating the operations illustrated in FIG. 11.

As illustrated in FIG. 11, after the process at Step S262, the control unit 48 determines whether the execution button 62 is pressed or not (Step S263).

Upon determining that the execution button 62 is not pressed at Step S263, the control unit 48 determines whether the cancel button 63 is pressed or not (Step S264).

Upon determining that the cancel button 63 is pressed at Step S264, the control unit 48 terminates the operations illustrated in FIG. 11.

Upon determining that the cancel button 63 is not pressed at Step S264, the control unit 48 executes the process at Step S263.

Upon determining that the execution button 62 is pressed at Step S263, the control unit 48 obtains the instruction execution type print job specified in the list box 61 (Step S265). Here, the control unit 48 obtains this instruction execution type print job from the server 30 when the instruction execution type print job specified in the list box 61 is spooled by the server 30. The control unit 48 obtains this instruction execution type print job from the storage unit 47 when the instruction execution type print job specified in the list box 61 is spooled by the MFP 40.

After the process at Step S265, the control unit 48 executes the instruction execution type print job obtained at Step S265 by the printer 43 (Step S266), and then terminates the operations illustrated in FIG. 11.

The above described the execution of the instruction execution type print job. However, the printing system 10 also supports the execution of a normal print job, which is not the instruction execution type print job. That is, when the normal print job is transmitted from the user terminal 20 to the MFP 40, the MFP 40 executes this print job by the printer 43 without spooling this print job as the instruction execution type print job 47b in the storage unit 47.

As described above, in the printing system 10, after obtaining the determination information for determining whether the MFP 40 is capable of spooling the instruction execution type print job or not from the MFP 40 (Step S161 and Step S231 to Step S233), the user terminal 20 transmits the instruction execution type print job to the MFP 40 (Step S205) when determining that the MFP 40 is capable of spooling the instruction execution type print job based on the determination information (YES at Step S135 and YES at Step S204). Accordingly, the printing system 10 ensures reducing occurrence of failure to transmit the instruction execution type print job from the user terminal 20 to the MFP 40 that is not capable of spooling the instruction execution type print job.

In the printing system 10, the user terminal 20 obtains the determination information via the service provided by the MFP 40 executing the application 47a for spooling the instruction execution type print job (Step S161 and Step S231 to Step S233). Accordingly, the printing system 10 ensures the improved reliability of the determination by the user terminal 20 whether the MFP 40 is capable of spooling the instruction execution type print job or not. As a result, the printing system 10 ensures further reducing the occurrence of failure to transmit the instruction execution type print job from the user terminal 20 to the MFP 40 that is not capable of spooling the instruction execution type print job.

In the printing system 10, when determining that the MFP 40 is capable of spooling the instruction execution type print job (YES at Step S135), the user terminal 20 registers the spool port number of the MFP 40 (Step S137). Accordingly, the printing system 10 can transmit the instruction execution type print job to the MFP 40 that is capable of spooling the instruction execution type print job using the spool port number (Step S205). As a result, the printing system 10 ensures further reducing the occurrence of failure to transmit the instruction execution type print job from the user terminal 20 to the MFP 40 that is not capable of spooling the instruction execution type print job.

While the print apparatus of the disclosure is the MFP according to the embodiment, a print apparatus other than the MFP, such as a printer-only machine, may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A printing system comprising:
an electronic device that generates a print job; and
a print apparatus that executes the print job;
the electronic device including
   a central processing unit (CPU), and
   a storage device that stores a printer driver for generating print data and a job transmission program for transmitting the print data generated by the printer driver as the print job; wherein
the CPU executes the job transmission program to function as
   a spool availability determination unit that executes a determination of whether the print apparatus is capable of spooling an instruction execution type print job as the print job, executed in accordance with a specific instruction, and
   a job transmitter that transmits the instruction execution type print job to the print apparatus when the spool availability determination unit determines that the print apparatus is capable of spooling the instruction execution type print job; and
the spool availability determination unit obtains determination information for the determination from the print apparatus;
the print apparatus stores an application for spooling the instruction execution type print job and executes the application to provide a service;
the spool availability determination unit obtains the determination information by calling the service;
the determination information includes at least a version of the application; and
the spool availability determination unit manages the version of the application when the application has a function to spool the instruction execution type print job, and determines whether the application has the function to spool the instruction execution type print job based on the version of the application.

2. A printing system comprising:
an electronic device that generates a print job; and
a print apparatus that executes the print job;
the electronic device including
   a central processing unit (CPU), and a storage device that stores a printer driver for generating print data and a job transmission program for transmitting the print data generated by the printer driver as the print job; wherein the CPU executes the job transmission program to function as a spool availability determination unit that executes a determination of whether the print apparatus is capable of spooling an instruction execution type print job as the print job, executed in accordance with a specific instruction, and a job transmitter that transmits the instruction execution type print job to the print apparatus when the spool availability determination unit determines that the print apparatus is capable of spooling the instruction execution type print job;

the spool availability determination unit obtains determination information for the determination from the print apparatus;

the CPU of the electronic device executes the job transmission program to further function as a port number registration unit that registers a spool port number for spooling the instruction execution type print job out of port numbers of the print apparatus;

the job transmitter transmits the instruction execution type print job to the print apparatus using the spool port number registered by the port number registration unit; and the port number registration unit causes the spool availability determination unit to execute the determination before registering the spool port number, and registers the spool port number when the spool availability determination unit has determined that the print apparatus is capable of spooling the instruction execution type print job.

3. A printing system comprising:

an electronic device that generates a print job; and a print apparatus that executes the print job;

the electronic device including a central processing unit (CPU), and a storage device that stores a printer driver for generating print data and a job transmission program for transmitting the print data generated by the printer driver as the print job; wherein the CPU executes the job transmission program to function as a spool availability determination unit that executes a determination of whether the print apparatus is capable of spooling an instruction execution type print job as the print job, executed in accordance with a specific instruction, and a job transmitter that transmits the instruction execution type print job to the print apparatus when the spool availability determination unit determines that the print apparatus is capable of spooling the instruction execution type print job;

the spool availability determination unit obtains determination information for the determination from the print apparatus;

the printing system further comprises a server;

the server permits a user to log in when authentication information identical to authentication information of the user transmitted from the electronic device is stored and transmits an access token indicative of the permission of the log in to the electronic device;

the job transmitter associates the instruction execution type print job with the authentication information and the access token and transmits to the print apparatus;

the print apparatus and the server each store an application for spooling the instruction execution type print job and execute the application to provide a service;

the spool availability determination unit obtains the determination information by calling the service;

the determination information includes at least a version of the application;

the spool availability determination unit manages the version of the application when the application has a function to spool the instruction execution type print job, and determines whether the application has the function to spool the instruction execution type print job based on the version of the application; and the job transmitter associates the instruction execution type print job with the authentication information and the access token and transmits to the server when the application of the server is determined to have the function to spool the instruction execution type print job, determines whether the application of the print apparatus has the function to spool the instruction execution type print job when the application of the server is determined not to have the function to spool the instruction execution type print job, and associates the instruction execution type print job with the authentication information and the access token and transmits to the print apparatus when the application of the print apparatus is determined to have the function to spool the instruction execution type print job.

4. A non-transitory computer-readable recording medium that stores a job transmitting program executed by an electronic device that generates a print job, the job transmitting program causing the electronic device to function as:

a spool availability determination unit that executes a determination of whether a print apparatus that executes the print job is capable of spooling an instruction execution type print job as the print job, executed in accordance with a specific instruction; and a job transmitter that transmits the instruction execution type print job to the print apparatus when the spool availability determination unit determines that the print apparatus is capable of spooling the instruction execution type print job; wherein the spool availability determination unit obtains determination information for the determination from the print apparatus;

the print apparatus stores an application for spooling the instruction execution type print job and executes the application to provide a service;

the spool availability determination unit obtains the determination information by calling the service;

the determination information includes at least a version of the application; and the spool availability determination unit manages the version of the application when the application has a function to spool the instruction execution type print job, and determines whether the application has the function to spool the instruction execution type print job based on the version of the application.

* * * * *